(12) United States Patent
Moeser et al.

(10) Patent No.: US 10,288,067 B2
(45) Date of Patent: May 14, 2019

(54) ELECTRIC MOTOR-DRIVEN MOTOR-VEHICLE VACUUM PUMP, AND DRIVE SHAFT FOR A MOTOR VEHICLE VACUUM PUMP

(71) Applicant: MAGNA POWERTRAIN BAD HOMBURG GMBH, Bad Homburg (DE)

(72) Inventors: Dietmar Moeser, Marienheide (DE); Benjamin Pyrdok, Bergisch Gladbach (DE); Freddy Schönwald, Hückeswagen (DE); Carsten Sczesny, Bochum (DE); Daniel Ziehr, Remscheid (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 297 days.

(21) Appl. No.: 14/646,479

(22) PCT Filed: Nov. 19, 2013

(86) PCT No.: PCT/DE2013/100391
§ 371 (c)(1),
(2) Date: Jul. 29, 2015

(87) PCT Pub. No.: WO2014/086338
PCT Pub. Date: Jun. 12, 2014

(65) Prior Publication Data
US 2016/0032926 A1    Feb. 4, 2016

(30) Foreign Application Priority Data
Dec. 4, 2012    (DE) .................. 10 2012 111 774

(51) Int. Cl.
F16D 3/02    (2006.01)
F16D 3/04    (2006.01)
(Continued)

(52) U.S. Cl.
CPC ........ F04C 29/0078 (2013.01); F01C 17/066 (2013.01); F04C 15/0073 (2013.01);
(Continued)

(58) Field of Classification Search
CPC .............. F04C 15/0073; F04C 15/0076; F04C 29/0071; F04C 29/0078; F04C 25/02;
(Continued)

(56) References Cited

U.S. PATENT DOCUMENTS 1,526,356 A * 2/1925 Arnulph .............. F04C 15/0073
418/206.1
2,650,754 A * 9/1953 Leopold .................. F04C 29/02
192/82 T
(Continued)

FOREIGN PATENT DOCUMENTS

CN    1724896 A    1/2006
DE    2336307 A1    1/1975
(Continued)

OTHER PUBLICATIONS

Search Report dated Jun. 9, 2016 in corresponding German Patent Application No. 11 2013 005 784.0 (one page).
(Continued)

Primary Examiner — Mark A Laurenzi
Assistant Examiner — Xiaoting Hu
(74) Attorney, Agent, or Firm — Dickinson Wright PLLC

(57) ABSTRACT

The invention relates to an electric motor-driven motor-vehicle vacuum pump (1), having a drive shaft (3) which has, in particular, two bearings and extends with a shaft stub (5; 35; 45) into a rotor (8) which is connected fixedly to the
(Continued)

shaft stub so as to rotate with it. In the rotor, the shaft stub has a centring region (26; 36; 46) which serves to center the rotor, without guiding the rotor in the axial direction.

20 Claims, 2 Drawing Sheets

(51) Int. Cl.
| | | |
|---|---|---|
| *F01C 17/06* | (2006.01) | |
| *F04C 15/00* | (2006.01) | |
| *F04C 25/02* | (2006.01) | |
| *F04C 29/00* | (2006.01) | |
| *F04C 18/344* | (2006.01) | |

(52) U.S. Cl.
CPC ........ *F04C 15/0076* (2013.01); *F04C 18/344* (2013.01); *F04C 18/3448* (2013.01); *F04C 25/02* (2013.01); *F04C 29/0071* (2013.01); *F04C 29/0085* (2013.01); *F16D 3/02* (2013.01); *F16D 3/04* (2013.01); *F04C 2240/60* (2013.01); *Y10T 464/40* (2015.01); *Y10T 464/50* (2015.01)

(58) Field of Classification Search
CPC ....... Y10T 464/40; Y10T 464/50; F16D 3/06; F01C 17/066
See application file for complete search history.

(56) References Cited

U.S. PATENT DOCUMENTS

| | | | | |
|---|---|---|---|---|
| 3,113,527 A | * | 12/1963 | Kramer | ............... F04C 15/0076 418/182 |
| 3,955,905 A | * | 5/1976 | Frommholz | .......... F01C 21/104 403/225 |
| 4,808,094 A | * | 2/1989 | Sugimoto | ........... F04C 29/0057 418/1 |
| 5,100,308 A | * | 3/1992 | Gevelhoff | ............. F01C 21/102 418/152 |
| 5,312,229 A | * | 5/1994 | Sano | ....................... F01C 21/02 418/182 |
| 6,425,749 B1 | * | 7/2002 | Lettner | ................... F02B 67/04 403/188 |
| 2004/0137993 A1 | * | 7/2004 | Agner | ................... F16D 1/0876 464/162 |

FOREIGN PATENT DOCUMENTS

| | | | |
|---|---|---|---|
| EP | 0902186 A1 | | 3/1999 |
| FR | 2238379 | | 2/1975 |
| GB | 1092548 A | | 11/1967 |
| JP | 58183990 U | * | 12/1983 |
| JP | H10246187 A | | 9/1998 |
| JP | 2004242056 | | 8/2004 |
| KR | 20110106045 A | * | 9/2011 |
| KR | 1020110106045 | | 9/2011 |
| WO | WO2011134448 A2 | | 11/2011 |
| WO | 2012097785 A1 | | 7/2012 |
| WO | 2012101696 A1 | | 8/2012 |

OTHER PUBLICATIONS

International Search Report dated Feb. 20, 2014.
Search Report dated Apr. 13, 2016 in corresponding Chinese Patent Application No. 201380061386.0 (two pages).

* cited by examiner

ELECTRIC MOTOR-DRIVEN MOTOR-VEHICLE VACUUM PUMP, AND DRIVE SHAFT FOR A MOTOR VEHICLE VACUUM PUMP

CROSS-REFERENCE TO RELATED APPLICATIONS

This application is a National Stage of International Application No. PCT/DE2013/100391 filed Nov. 19, 2013 and which claims the benefit and priority of German Application No. 10 2012 111 774.8 filed Dec. 4, 2012. The entire disclosure of each of the above applications is incorporated herein by reference.

FIELD

The invention relates to an electric motor-driven motor-vehicle vacuum pump, having a drive shaft which has, in particular, two bearings and which extends with a shaft stub into a rotor, which is rotationally fixed to the shaft stub.

BACKGROUND

The international publication WO 02/099300 A1 discloses a shaft-hub connection for transmitting a torque between a shaft and a hub by means of at least one driving element, wherein the contact face between the shaft and the hub and/or between the shaft and the driving element and/or between the hub and the driving element is/are minimized in an axial direction. The shaft may be spherically formed on its outer circumference in the area of the hub.

SUMMARY

The object of the invention is to improve an electric motor-driven motor-vehicle vacuum pump, having a drive shaft which has, in particular, two bearings and which extends with a shaft stub into a rotor, which is rotationally fixed to the shaft stub, having particular regard to its service life and/or having regard to its manufacturing costs.

The object is achieved, in the case of an electric motor-driven motor-vehicle vacuum pump, having a drive shaft which has, in particular, two bearings and which extends with a shaft stub into a rotor, which is rotationally fixed to the shaft stub, in that the shaft stub in the rotor comprises a centering area, which serves for centering the rotor, without guiding the rotor in an axial direction. The term axial relates to an axis of rotation of the drive shaft and of the rotor. The term axial means in the direction of or parallel to the axis of rotation of the drive shaft and of the rotor. The term radial means transversely to the axis of rotation of the shaft and of the rotor. Centering the rotor positions it in a radial direction relative to the drive shaft. Here the centering area is advantageously designed so that the shaft stub is able to perform a sort of tipping or wobbling motion and to tilt in the rotor. The drive shaft is preferably supported by means of two bearings in an electric motor, which serves for driving the motor-vehicle vacuum pump. The centering area according to the invention affords very precise radial guiding of the rotor. The precise guiding in a radial direction means that the play between the shaft stub and the rotor in a radial direction is reduced virtually to zero. An unwanted rotor radial gap can thereby be kept small, therefore minimizing an unwanted leakage flow between a suction side and a delivery side of the motor-vehicle vacuum pump. Owing to production tolerances and/or assembly tolerances and deformations, due to operating loads, for example, unwanted angular errors can occur between the shaft axis and the rotor longitudinal axis. This means that the shaft axis is generally not precisely parallel to or coaxial with the rotor longitudinal axis. The angular error due to tolerances gives rise, when the drive shaft is rotating, to a wobbling of the rotor relative to the drive shaft. Otherwise a significantly greater axial play of the rotor in the housing would be necessary, which is again undesirable. Moreover, an increased knocking of the rotor in the housing could occur, which is likewise undesirable. The centering area according to the invention means that the rotor is not connected rigidly to the shaft stub. This allows the wobbling motion dependent on tolerances. The wear caused in the operation of the motor-vehicle vacuum pump can thereby be reduced significantly. In addition, advantageously larger production and/or fitting tolerances can be permitted.

A preferred exemplary embodiment of the electric motor-driven motor-vehicle vacuum pump is characterized in that the shaft stub in the centering area is spherically formed. This is particularly advantageous in allowing a tilting, tipping or wobbling of the shaft stub in the centered rotor.

A further preferred exemplary embodiment of the electric motor-driven motor-vehicle vacuum pump is characterized in that the shaft stub in the centering area is arranged with a centering diameter affording virtually no play in a rotor opening. The rotor opening is advantageously designed as a central bore in the rotor.

A further preferred exemplary embodiment of the electric motor-driven motor-vehicle vacuum pump is characterized in that the centering diameter of the shaft stub, in relation to an extent of the rotor in an axial direction, is arranged substantially centrally in the rotor. This arrangement has proved particularly advantageous with regard to production-dependent fitting tolerances.

A further preferred exemplary embodiment of the electric motor-driven motor-vehicle vacuum pump is characterized in that the motor-vehicle vacuum pump is designed as a dry-running pump. The term dry-running means, in particular, having no supply of lubricant.

A further preferred exemplary embodiment of the electric motor-driven motor-vehicle vacuum pump is characterized in that the motor-vehicle vacuum pump is designed as a vane pump having at least one vane. At least the one vane is guided in the rotor. At least the one vane bears with its vane ends, or with caps fitted to the vane ends, internally on a swept contour.

A further preferred exemplary embodiment of the electric motor-driven motor-vehicle vacuum pump is characterized in that the rotor opening is designed as a through-hole or blind hole. The rotor opening is advantageously designed as a central bored passage or bored blind hole in the rotor.

A further preferred exemplary embodiment of the electric motor-driven motor-vehicle vacuum pump is characterized in that the shaft stub in the centering area is convexly curved, viewed in longitudinal section. In this case the radius of curvature is advantageous selected so that the shaft stub in the rotor opening is able to perform a wobbling motion or to tilt. The rotor centered on the shaft stub is therefore able to perform tolerance-dependent compensating movements in a housing of the motor-vehicle vacuum pump.

A further preferred exemplary embodiment of the electric motor-driven motor-vehicle vacuum pump is characterized in that, viewed in longitudinal section, the shaft stub in the centering area is defined radially outwards by two circular arcs. The circular arcs are convexly curved and advantageously have the same radius of curvature.

A further preferred exemplary embodiment of the electric motor-driven motor-vehicle vacuum pump is characterized in that the shaft stub in the centering area has the shape of a ball. The radius of the ball is matched to the dimensions of the rotor opening and of the shaft stub, so that the drive shaft is able to tilt sufficiently or to perform a sufficient wobbling motion.

A further preferred exemplary embodiment of the electric motor-driven motor-vehicle vacuum pump is characterized in that at its free end the shaft stub is rotationally fixed to the rotor. The rotationally fixed connection means that a drive torque, needed for driving the motor-vehicle vacuum pump, can be transmitted from the drive shaft to the rotor.

A further preferred exemplary embodiment of the electric motor-driven motor-vehicle vacuum pump is characterized in that the shaft stub is rotationally fixed to the rotor by means of an Oldham coupling. The Oldham coupling represents an easy way of embodying the rotationally fixed connection, so that the drive shaft with the shaft stub is able to tilt in relation to the rotor and to perform a wobbling motion in the rotor.

A further preferred exemplary embodiment of the electric motor-driven motor-vehicle vacuum pump is characterized in that the rotor in an axial direction is arranged between two side faces. The side faces extend substantially perpendicularly to the axis of rotation of the shaft and of the rotor. The side faces guide the rotor in an axial direction.

A further preferred exemplary embodiment of the electric motor-driven motor-vehicle vacuum pump is characterized in that the centering area has an extent in an axial direction which is approximately half the extent of the rotor in an axial direction. The centering diameter of the centering area is advantageously arranged in the center of the rotor. The expression center here relates to the extent of the rotor in an axial direction.

The invention further relates to a drive shaft for a motor-vehicle vacuum pump previously described. The drive shaft with the centering area may be treated separately.

DRAWINGS

Further advantages, features and details of the invention ensue from the following description, in which various exemplary embodiments are described in detail with reference to the drawing, in which.

DETAILED DESCRIPTION

Figure 1:
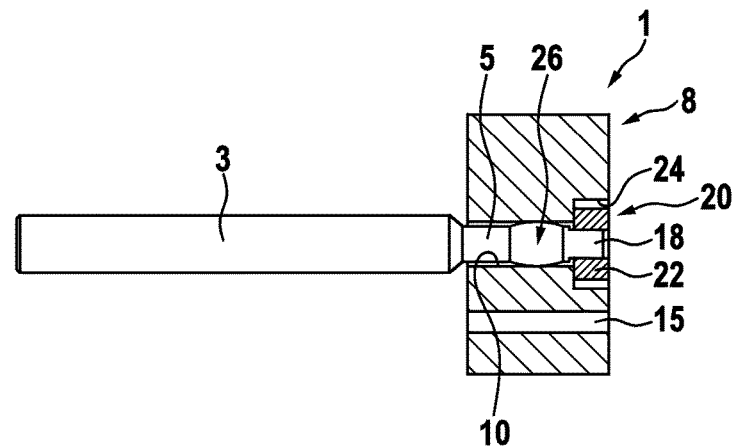
FIG. 1 shows a sub-assembly of a motor-vehicle vacuum pump according to the invention in longitudinal section.
Figure 2:
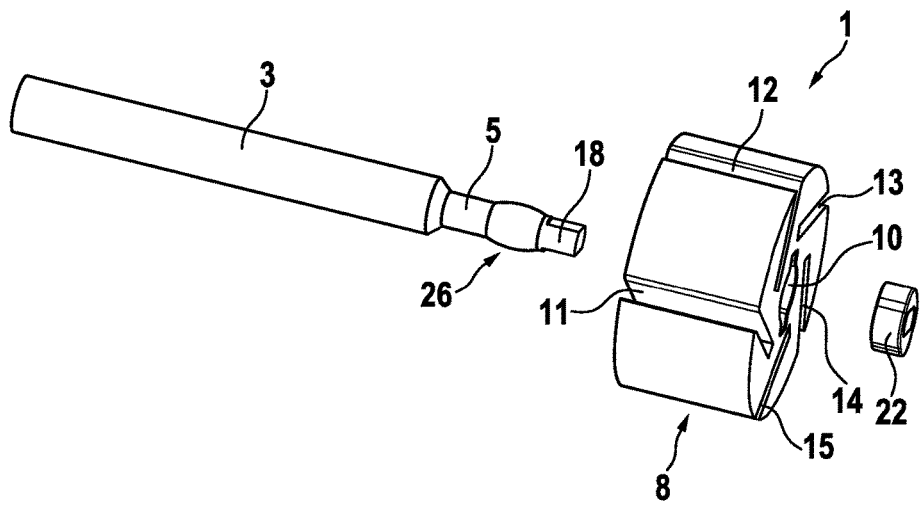
FIG. 2 shows an exploded view of the sub-assembly in FIG. 1.

FIGS. 1 and 2 represent two different views of a sub-assembly of an electric motor-driven motor-vehicle vacuum pump 1. The motor-vehicle vacuum pump 1 is driven by an electric motor (not shown) and is designed as a dry-running pump. A drive shaft 3 of the motor-vehicle vacuum pump 1 is supported in the electric motor on two bearings.

From the drive shaft 3, a shaft stub 5 extends into a rotor 8 of the motor-vehicle vacuum pump 1. To receive the shaft stub 5, the rotor 8 comprises a rotor opening 10, which is designed as a through-hole in the form of a central bore.

The rotor 8 is equipped with a total of five vane slots 11 to 15 for guiding vanes (not shown). The motor-vehicle vacuum pump 1 with the rotor 8 and the vanes is also referred to as a vane pump. The general construction and the working of a vane pump are described, for example, in international publications WO 2004/074687 A2 and WO 2011/134448 A2.

At a free end 18 of the shaft stub 5, the drive shaft 3 of the motor-vehicle vacuum pump 1 is rotationally fixed to the rotor 8 by means of an Oldham coupling 20. The Oldham coupling 20 comprises a coupling element 22, which is fitted, rotationally fixed, onto the dihedral free end 18 of the shaft stub 5. A rotationally fixed connection is thereby created between the free end 18 of the shaft stub 5 and the coupling element 22.

In addition, the coupling element 22 is received in a coupling aperture 24 of the rotor 8 for the rotationally fixed connection to the rotor 8. The Oldham coupling 20 known in the art allows tilting of the drive shaft 3 relative to the rotor 8, despite the rotationally fixed connection between the free end 18 of the shaft stub 5. A sort of wobbling motion of the drive shaft 3 relative to the rotor 8 is thereby allowed during operation of the motor-vehicle vacuum pump 1.

According to a principal aspect of the invention, this wobbling motion is allowed by virtue of a centering area 26, which is formed on the shaft stub 5 approximately in the center of the rotor 8. The term center here relates to the extent of the rotor 8 in an axial direction. The term axial means in the direction of the longitudinal axis or axis of rotation of the drive shaft 3.

The longitudinal axis or axis of rotation of the drive shaft 3 substantially coincides, apart from a tolerance-dependent angular error, with the axis of rotation of the rotor 8. In the centering area 26 the shaft stub 5 of the drive shaft 3 is spherically formed. The spherical formation serves to ensure a sufficient angular mobility of the drive shaft 3 in relation to the rotor 8 when there is very little play between the shaft stub 5 and the rotor opening 10 in a radial direction.

Figure 3:
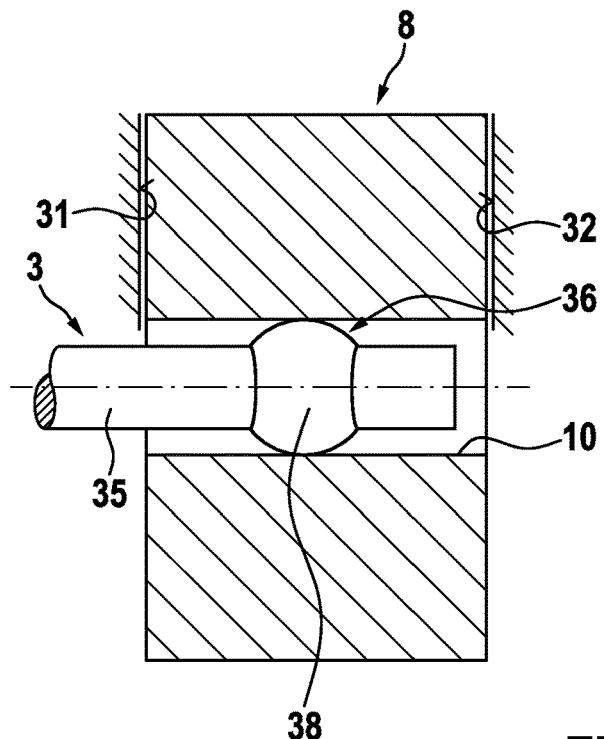
FIG. 3 shows a highly simplified representation of a motor-vehicle vacuum pump according to the invention in longitudinal section.

Two side faces 31, 32, between which the rotor 8 is guided in an axial direction, are indicated in FIG. 3. Although not represented as such, the rotor 8 bears on the side faces 31, 32 for the most part virtually without any play. In a centering area 36 a shaft stub 35 has the shape of a ball 38. The spherical formation of the shaft stub 35 in the centering area 36 is particularly advantageous in allowing virtually no play between the drive shaft 3 and the rotor 8 in a radial direction, without restricting the wobbling motion of the drive shaft 3 in the rotor 8.

Figure 4:
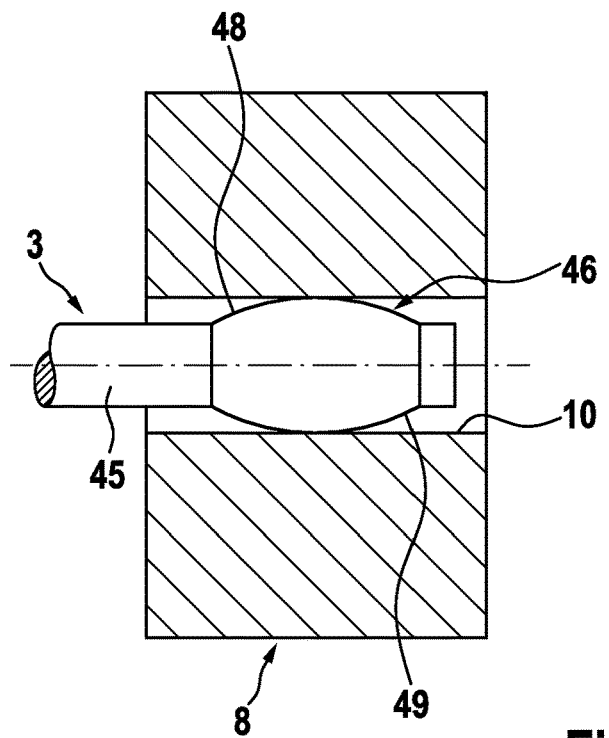
FIG. 4 shows a similar exemplary embodiment to FIG. 3.

In FIG. 4 a shaft stub 45 of the drive shaft 3 is of spherical design in a centering area 46. The spherical design means that the contact pressure per unit area, in particular the Hertzian stress, between the shaft stub 45 and the rotor 8 is reduced. Where there is very little play between the shaft stub 45 and the rotor 8 a sufficient angular mobility of the drive shaft 3 relative to the rotor 8 can nevertheless be ensured.

The shaft stub 45 is convexly curved in the centering area 46. In longitudinal section the centering area 46 is defined by two circular arcs 48, 49. The shaft stub 45 thereby takes on a spherical shape in the centering area 46.

LIST OF REFERENCE NUMERALS 1 motor-vehicle vacuum pump
3 drive shaft
5 shaft stub
8 rotor 10 rotor opening
11 vane slot
12 vane slot
13 vane slot
14 vane slot
15 vane slot
18 end
20 Oldham coupling
22 coupling element
24 coupling aperture
26 centering area
31 side face
32 side face
35 shaft stub
36 centering area
38 ball
45 shaft stub
46 centering area
48 circular arc
49 circular arc

The invention claimed is:

1. An electric motor-driven motor-vehicle vacuum pump, including:
a drive shaft which has two bearings and which extends along an axis;
a shaft stub extending axially from the drive shaft and terminating axially at a free end;
a rotor disposed about the shaft stub;
the rotor defining a coupling aperture extending axially therein along the axis;
a coupling element positioned in the coupling aperture and rotationally fixing the free end of the shaft stub and the rotor and configured to allow tilting of the drive shaft relative to the rotor during rotation of the drive shaft and rotor;
wherein the shaft stub in the rotor comprises a centering area axially spaced from the coupling element and the free end of the shaft stub for centering the rotor without guiding the rotor in an axial direction, and wherein the centering area extends radially outwardly and has a convexly curved shape along a plane extending through the axis for providing angular mobility of the drive shaft in relation to the rotor.

2. The electric motor-driven motor-vehicle vacuum pump as claimed in claim 1, wherein the shaft stub in the centering area is spherically formed.

3. The electric motor-driven motor-vehicle vacuum pump as claimed in claim 1, wherein the shaft stub in the centering area is arranged with a centering diameter affording virtually no play in a rotor opening.

4. The electric motor-driven motor-vehicle vacuum pump as claimed in claim 3, wherein the centering diameter of the shaft stub, in relation to an extent of the rotor in the axial direction, is arranged substantially centrally in the rotor.

5. The electric motor-driven motor-vehicle vacuum pump as claimed in claim 1, wherein the motor-vehicle vacuum pump is a dry-running pump.

6. The electric motor-driven motor-vehicle vacuum pump as claimed in claim 1, wherein the motor-vehicle vacuum pump is a vane pump having at least one vane.

7. The electric motor-driven motor-vehicle vacuum pump as claimed in claim 1, wherein the rotor defines a rotor opening being a through-hole.

8. The electric motor-driven motor-vehicle vacuum pump as claimed in claim 1, wherein the rotor defines a rotor opening being a blind hole.

9. The electric motor-driven motor-vehicle vacuum pump as claimed in claim 1, wherein when viewed in longitudinal section, the shaft stub in the centering area has an ellipsoid shape being defined radially outwards by two circular arcs.

10. The electric motor-driven motor-vehicle vacuum pump as claimed in claim 1, wherein the shaft stub in the centering area has the shape of a ball.

11. The electric motor-driven motor-vehicle vacuum pump as claimed in claim 1, wherein the centering area has an extent in the axial direction which is approximately half the extent of the rotor in the axial direction, but at least 0.5 mm.

12. The electric motor-driven motor-vehicle vacuum pump as claimed in claim 1, wherein the centering area has a convexly curved shape about an entire outer periphery of the centering area.

13. An electric motor-driven motor-vehicle vacuum pump, including:
a drive shaft having two bearings and extending along an axis;
a shaft stub extending axially from the drive shaft and terminating axially at a free end;
a rotor disposed about the shaft stub;
a coupling element rotationally fixing the free end of the shaft stub and the rotor and configured to allow tilting of the drive shaft relative to the rotor during rotation of the drive shaft and rotor;
wherein the shaft stub in the rotor comprises a centering area axially spaced from the coupling element and the free end of the shaft stub for centering the rotor without guiding the rotor in an axial direction, and wherein the centering area extends radially outwardly and has a convexly curved shape along a plane extending through the axis for providing angular mobility of the drive shaft in relation to the rotor;
wherein the rotor extends between a first axial surface and a second axial surface being generally parallel with one another, wherein the first axial surface defines a rotor opening extending axially therein toward the second axial surface along the axis, and wherein the second axial surface defines a coupling aperture extending axially therein along the axis, wherein the rotor opening extends into the coupling aperture, and wherein the coupling aperture extends radially outwardly past the rotor opening.

14. The electric motor-driven motor-vehicle vacuum pump as claimed in claim 13, wherein the free end of the shaft stub is dihedral, and wherein the coupling element is an Oldham coupling and surrounds and is rotationally fixed to the shaft stub and is positioned in the coupling aperture.

15. The electric motor-driven motor-vehicle vacuum pump as claimed in claim 13, wherein the rotor in the axial direction is arranged between two side faces.

16. The electric motor-driven motor-vehicle vacuum pump as claimed in claim 13, wherein the shaft stub extends through the rotor opening, and wherein the free end of the shaft stub is positioned in the coupling aperture.

17. The electric motor-driven motor-vehicle vacuum pump as claimed in claim 16, wherein the coupling element is fitted in the coupling aperture, and wherein the free end and the coupling element form a rotationally fixed connection.

18. The electric motor-driven motor-vehicle vacuum pump as claimed in claim 13, wherein the centering area is positioned in the rotor opening, and wherein an outermost diameter of the centering area is substantially the same as a diameter of the rotor opening.

19. The electric motor-driven motor-vehicle vacuum pump as claimed in claim 13, wherein the drive shaft extends into the rotor opening through the first axial surface opposite the coupling aperture, and wherein the coupling element is positioned in the coupling aperture.

20. An electric motor-driven motor-vehicle vacuum pump, including:
- a drive shaft which has two bearings and which extends along an axis;
- a shaft stub extending axially from the drive shaft and terminating axially at a free end;
- a rotor disposed about the shaft stub;
- the rotor defining a coupling aperture extending axially therein along the axis;
- a coupling element positioned in the coupling aperture and rotationally fixing the free end of the shaft stub and the rotor and configured to allow tilting of the drive shaft relative to the rotor during rotation of the drive shaft and rotor;
- wherein the shaft stub in the rotor comprises a centering area axially spaced from the coupling element and the free end of the shaft stub for centering the rotor without guiding the rotor in an axial direction, and wherein the centering area extends radially outwardly and has a convexly curved shape along a plane extending through the axis for providing angular mobility of the drive shaft in relation to the rotor;
- wherein said electric motor-driven motor-vehicle vacuum pump does not include a supply of lubricant.

* * * * *